(12) United States Patent
Datla et al.

(10) Patent No.: US 8,010,952 B2
(45) Date of Patent: Aug. 30, 2011

(54) METHOD AND APPARATUS FOR CONFIGURATION SYNTAX AND SEMANTIC VALIDATION

(75) Inventors: Krishnam Raju Datla, Union City, CA (US); Srinivasa Beereddy, Fremont, CA (US); Praveen Vengalam, Mountain View, CA (US); Chandrasekhar Guntakala, Sunnyvale, CA (US); Prasanthi Somepalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1092 days.

(21) Appl. No.: 11/148,708

(22) Filed: Jun. 8, 2005

(65) Prior Publication Data

US 2006/0004742 A1    Jan. 5, 2006

Related U.S. Application Data

(60) Provisional application No. 60/521,634, filed on Jun. 8, 2004.

(51) Int. Cl.
*G06F 9/45* (2006.01)

(52) U.S. Cl. .................. 717/143; 717/136; 717/142

(58) Field of Classification Search ............ 717/143
See application file for complete search history.

(56) References Cited

U.S. PATENT DOCUMENTS

| | | | |
|---|---|---|---|
| 4,617,643 A * | 10/1986 | Klock et al. | ............ 715/273 |
| 4,686,623 A * | 8/1987 | Wallace | ............ 717/143 |
| 4,972,264 A | 11/1990 | Bishop et al. | |
| 5,991,814 A | 11/1999 | Rzonca et al. | |
| 6,243,862 B1 * | 6/2001 | Lebow | ............ 717/131 |
| 6,405,365 B1 | 6/2002 | Lee | |
| 6,421,719 B1 | 7/2002 | Lewis et al. | |
| 6,502,112 B1 * | 12/2002 | Baisley | ............ 715/210 |
| 6,523,172 B1 * | 2/2003 | Martinez-Guerra et al. | .. 717/143 |
| 6,546,380 B1 | 4/2003 | Lautzenheiser et al. | |
| 6,597,666 B1 | 7/2003 | Hemzal et al. | |
| 6,601,059 B1 * | 7/2003 | Fries | ............ 707/3 |
| 6,615,257 B2 | 9/2003 | Lee et al. | |
| 6,625,590 B1 | 9/2003 | Chen et al. | |
| 6,920,458 B1 | 7/2005 | Chu et al. | |
| 6,996,769 B1 | 2/2006 | Peikes et al. | |
| 7,032,014 B2 | 4/2006 | Thiyagarajan et al. | |
| 7,051,101 B1 | 5/2006 | Dubrovsky et al. | |
| 7,113,989 B2 | 9/2006 | Murray et al. | |
| 7,216,298 B1 | 5/2007 | Ballard et al. | |
| 7,219,339 B1 * | 5/2007 | Goyal et al. | ............ 717/143 |
| 7,284,009 B2 | 10/2007 | Perrow | |
| 7,287,069 B1 | 10/2007 | Kavasseri et al. | |

(Continued)

OTHER PUBLICATIONS

"A simple standardized Ada command line interface", G. Gicca, May 1990, pp. 88-100, <http://delivery.acm.org/10.1145/390000/381842/p88-gicca.pdf>.*

(Continued)

*Primary Examiner* — Thuy Dao
(74) *Attorney, Agent, or Firm* — Varun A. Shah; Hickman Palermo Truong & Becker LLP

(57) ABSTRACT

Syntax and semantic validation of network commands use a command database that has been learned automatically for validation of the syntax and the semantics of command line interface commands by interpreting the network commands as the network commands are entered to identify syntax errors or semantic errors before applying the same commands on a device of interest.

32 Claims, 7 Drawing Sheets

U.S. PATENT DOCUMENTS

| | | | |
|---|---|---|---|
| 7,290,248 B2 * | 10/2007 | Sengodan | 717/136 |
| 7,376,719 B1 | 5/2008 | Shafer et al. | |
| 7,376,969 B1 | 5/2008 | Njemanze et al. | |
| 7,418,733 B2 | 8/2008 | Connary et al. | |
| 7,457,884 B2 | 11/2008 | Makioka | |
| 7,631,302 B2 * | 12/2009 | Cool et al. | 717/143 |
| 7,779,398 B2 * | 8/2010 | Tjong et al. | 717/143 |
| 2002/0004827 A1 | 1/2002 | Ciscon et al. | |
| 2002/0010726 A1 * | 1/2002 | Rogson | 707/533 |
| 2003/0028257 A1 | 2/2003 | Crawford et al. | |
| 2003/0061568 A1 | 3/2003 | Dijkstra | |
| 2003/0098887 A1 * | 5/2003 | Li | 345/809 |
| 2003/0101240 A1 | 5/2003 | Courtney | |
| 2003/0115305 A1 | 6/2003 | Murray et al. | |
| 2003/0126195 A1 * | 7/2003 | Reynolds et al. | 709/203 |
| 2003/0192030 A1 | 10/2003 | Hostettler et al. | |
| 2003/0226131 A1 * | 12/2003 | Li | 717/110 |
| 2004/0030771 A1 | 2/2004 | Strassner | |
| 2004/0040016 A1 * | 2/2004 | Pearce et al. | 717/141 |
| 2004/0111499 A1 | 6/2004 | Dobrowski et al. | |
| 2004/0117624 A1 | 6/2004 | Brandt et al. | |
| 2004/0153536 A1 | 8/2004 | Strassner | |
| 2004/0179142 A1 | 9/2004 | Fang | |
| 2004/0205737 A1 * | 10/2004 | Margaliot et al. | 717/143 |
| 2004/0210654 A1 | 10/2004 | Hrastar | |
| 2004/0230681 A1 * | 11/2004 | Strassner et al. | 709/226 |
| 2005/0004942 A1 | 1/2005 | Madsen et al. | |
| 2005/0015624 A1 | 1/2005 | Ginter et al. | |
| 2005/0060693 A1 * | 3/2005 | Robison et al. | 717/143 |
| 2005/0108387 A1 | 5/2005 | Li et al. | |
| 2005/0114479 A1 | 5/2005 | Watson-Luke | |
| 2005/0149872 A1 | 7/2005 | Fong et al. | |
| 2005/0174484 A1 | 8/2005 | Kwoh | |
| 2005/0182969 A1 | 8/2005 | Ginter et al. | |
| 2005/0262225 A1 | 11/2005 | Halpern et al. | |
| 2006/0004680 A1 | 1/2006 | Robarts et al. | |
| 2006/0195564 A1 | 8/2006 | Accardi et al. | |
| 2007/0180432 A1 | 8/2007 | Gassner et al. | |

OTHER PUBLICATIONS

Cisco Systems, "Using the Cisco IOS Command Line Interface", Cisco Systems, Chapter 3 of "Cisco 6200 User Guide", Oct. 2, 1998, 8 pages.

* cited by examiner

```xml
<?xml version='1.0' ?>
<CliParserData>
  <ViewList>
    <View name='test-view' prompt='test-view' level='0' parent='exec'>
      <Keyword id='root' hint='TopLevel' descr='TopLevel'>
        <!-- Start of test commands -->

<Keyword id='test' hint='test' descr='command syntax tester'>
          <Month id='month' hint='MONTH' descr='name of the month'>
            <Callback/>
          </Month>

<Time id='time' hint='hh:mm:ss' descr='time of the day'>
            <Callback/>
          </Time>
        </Keyword>

<!-- END of test commands -->
      </Keyword>
    </View>
  </ViewList>
</CliParserData>
```

*Fig. 4*

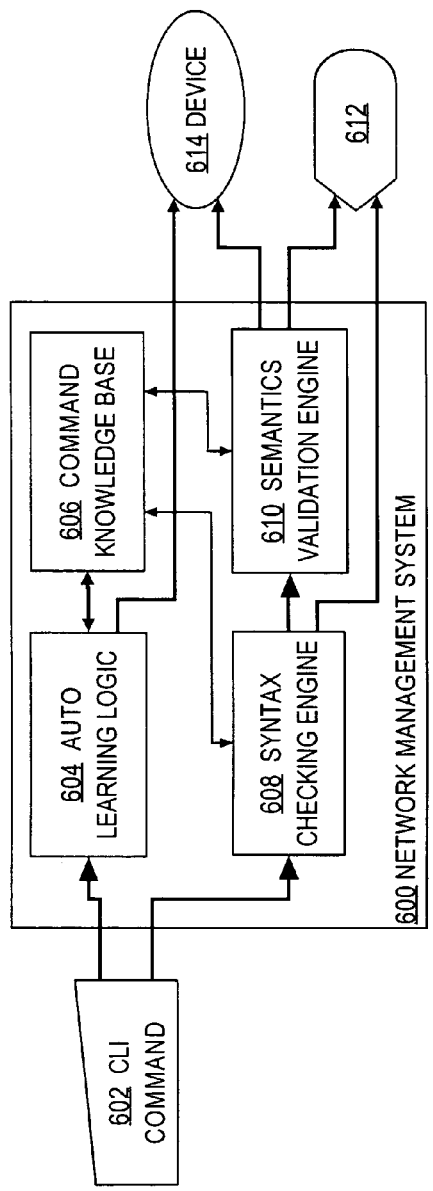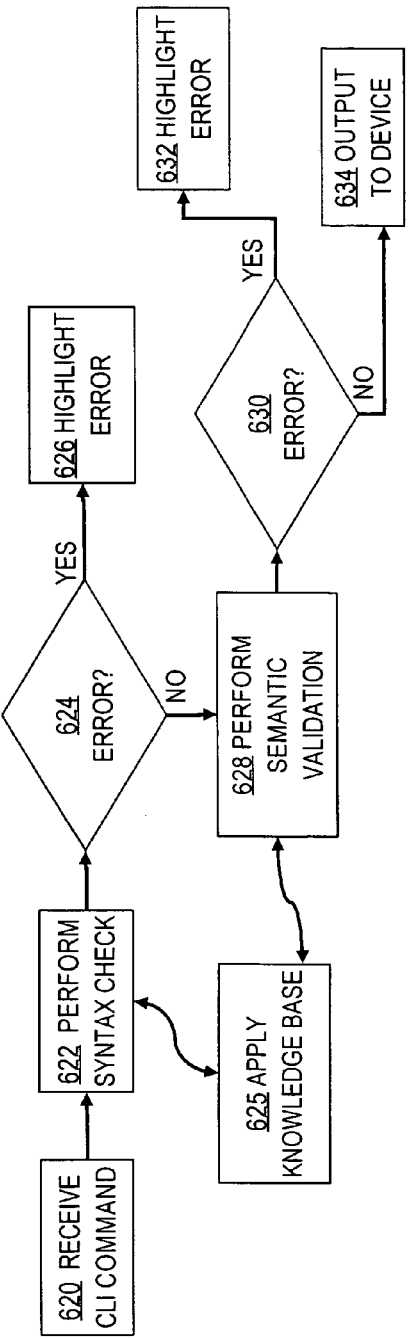

METHOD AND APPARATUS FOR CONFIGURATION SYNTAX AND SEMANTIC VALIDATION

CROSS-REFERENCE TO RELATED APPLICATIONS; PRIORITY CLAIM

This application claims benefit of Provisional Appln. 60/521,634, filed Jun. 8, 2004, the entire contents of which is hereby incorporated by reference as if fully set forth herein, under 35 U.S.C. §119(e).

This application is related to and hereby incorporates by reference U.S. application Ser. No. 11/148,709, filed Jun. 8, 2005, of Krishnam Raju Datla et al., entitled "Apparatus and Method for Intelligent Configuration Editor,"; U.S. application Ser. No. 11/148,725, filed Jun. 8, 2005, of Krishnam Raju Datla et al., entitled "Apparatus and Method for Programmable Network Intelligence,"; U.S. application Ser. No. 11/148,489, filed Jun. 8, 2005, of Krishnam Raju Datla et al., entitled "Method and Apparatus Providing Unified Compliant Network Audit,"; and U.S. application Ser. No. 11/148,487, filed Jun. 8, 2005, of Krishnam Raju Datla et al., entitled "Apparatus and Method for Data Model Prediction,".

FIELD OF THE INVENTION

The present invention generally relates to network management. The invention relates more specifically to approaches for validating configuration commands for network devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Typical devices used in packet-switched networks, such as routers and switches, provide a character-based command interface that is accessible through Telnet, Secure Shell (SSH) and serial port interfaces for changing the device status or configuration. Each configuration command has an associated syntax. A Network Management Station (NMS) can use configuration commands to provide a higher level or enhanced management capability to the network operator. For example, an NMS can implement a high-level operation, receive user input requesting the operation, automatically translate the requested operation into a set of configuration commands, and deliver the commands to the device over Telnet.

To operate in this manner, the NMS requires knowledge of the device configuration commands and the syntax of the commands.

One way of performing device configuration is to issue one or more configuration commands manually. In a large network consisting various kinds of devices, issuing manual commands is cumbersome and error-prone, as it is difficult for humans to remember the syntax and semantics associated with all commands for each kind of device and for each type of configuration. Further, each device on each interface or task may require different configuration commands and the semantics for each may vary. In addition, even in similar types of devices such as routers or switches different vendors may adopt different standards making the task even more complex.

Based on the foregoing, there is a clear need for improved approaches for configuring network devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is an example command knowledge base in XML format;

FIG. 6A is an example of a command validation system;

FIG. 6B is an example of a command validation process; and

DETAILED DESCRIPTION

Figure 1:
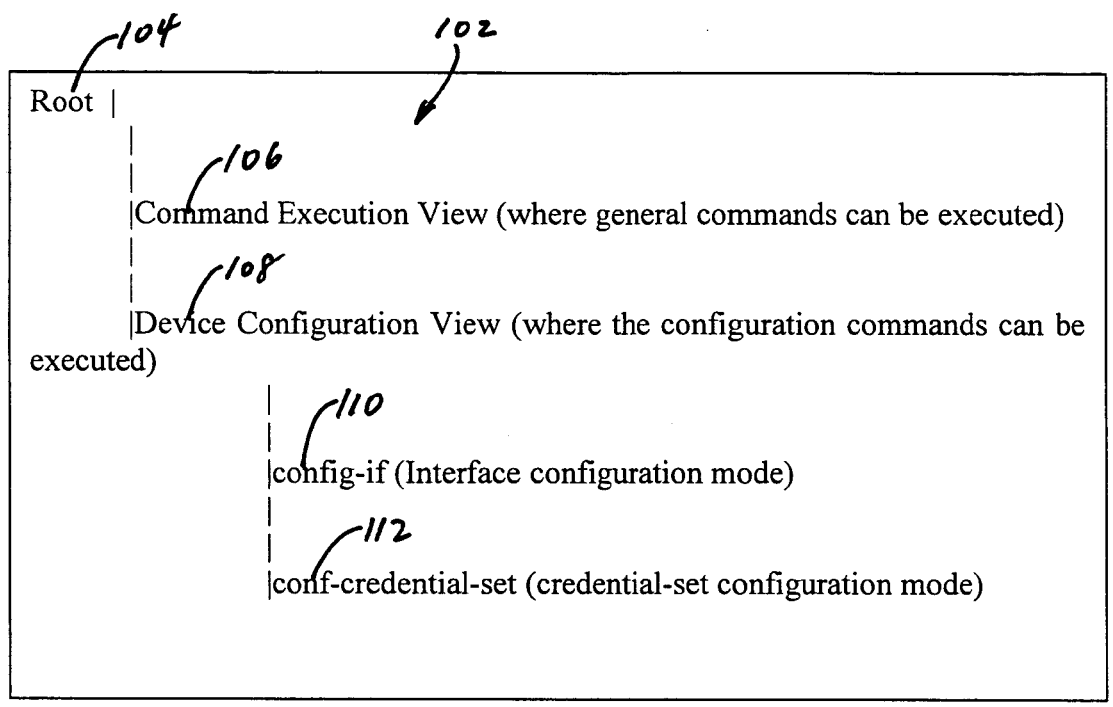
FIG. 1 is a block diagram that illustrates an overview of command views.

A method and apparatus for configuration syntax and semantic validation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Command Views
    2.2 Command Validation System
    2.3 Validating Syntax and Semantics of Device Commands
  3.0 Implementation Mechanisms-Hardware Overview
  4.0 Extensions and Alternatives
1.0 General Overview The needs identified in the foregoing Background, and other needs and objects that will become apparent for the following description, are achieved in the present invention, which comprises, in one aspect, a method for, comprising the machine-implemented steps of receiving user input representing at least a part of one or more commands for a network device; displaying the command part as the user input is entered; interpreting the command part as the user input is entered to identify one or more syntax errors or semantic errors in the user input; in response to identifying one or more syntax errors or semantic errors in the user input, generating and displaying a modified display that identifies the one or more syntax errors or semantic errors.

In one feature of this aspect, the interpreting includes validating the user input against a stored knowledge base of command syntax and semantics associated with a type of device that includes the network device and with a current command view. In another feature, the modified display identifies the one or more syntax errors or semantic errors by displaying the user input in a first color and displaying the errors in a second color.

In yet another feature, the interpreting is performed without connecting to the network device. In one feature, the interpreting includes validating the user mechanism input against a stored knowledge base of command syntax and semantics associated with a type of device that includes the network device and with a current command view, wherein the device knowledge bases of different type of devices are interpreted to produce a common command knowledge base that represents one or more commands common to all the devices. The devices with common commands may have different versions of operating system software.

In still another feature, the method further comprises concurrently receiving the user input at auto learning logic, wherein the auto learning logic interprets the user input and forms a stored knowledge base of command syntax and semantics associated with a type of device that includes the network device and with a current command view.

In yet another feature, the interpreting includes determining a current command view applicable to the command part and interpreting the command part based upon syntax and semantics in the knowledge base that are applicable to the current command view.

In another aspect, the invention provides an apparatus for performing syntax validation and semantic validation of commands for a network device, comprising one or more processors; a command knowledge base; and one or more stored sequences of instructions organized as auto learning logic, a syntax checking engine, and a semantics validation engine, and which, when executed by the processor, cause the processor to carry out the steps of the method described above.

In other aspects, the invention encompasses a computer apparatus and a computer-readable medium configured to carry out the foregoing steps.

2.0 Structural and Functional Overview

If an NMS could be provided with a knowledge base for the device type under consideration and complete knowledge regarding the semantics and syntax of the configuration commands, then the knowledge base could be used by the NMS to provide management capability for large number of device types very quickly and efficiently. Also, use of a knowledge base is less error prone compared to the manual entry of the commands.

If the NMS could have a way to intelligently group device types or provide a unified network view in which the whole network is visualized as a single device, then the configuration for a single device could be pushed on to several devices with a single command. This approach would stroke obviating the onus on the Network administrator to logging into each device and pushing the configuration.

All device commands are assumed to follow certain syntax. According to an embodiment, a knowledge base for the commands and the related syntax for each command supported by the device under every view is built using an Auto Learning Mechanism, and the information is kept in a database either in the form of binary or text or XML format. In one embodiment, the Auto Learning Mechanism is implemented using the approaches described in co-pending U.S. application Ser. No. 11/012,885, filed Dec. 14, 2004, entitled "Method and System for Automatically Determining Commands for a Network Element," of Krishnam R. Datla et al. ("Datla et al."). There could be exceptions to the allowed syntax. Exceptions are handled using special case handling which can be specific to the family of devices or the functionality/feature.

2.1 Command Views

FIG. 1 is a block diagram that illustrates an overview of command views. Referring first to FIG. 1, a multiway tree 102 comprising a root node and first-level nodes 106, 108 may represent a set of command views. In one embodiment, general commands are executed in command execution view 106 and configuration commands are executed in device configuration view 108. Views 106, 108 also represent different execution contexts, and different commands, syntax and semantics may apply in each of the views.

Any first-level node may have zero or more child nodes associated, for example, with command sub-modes. For example, device configuration view node 108 has an interface configuration node 110 that is accessed when a "config-if" command is entered in the device configuration view. The device configuration view node 108 also may have a credential-set configuration mode node 112 that is accessed when a "conf-credential-set" command is entered while in the device configuration view.

Accordingly, each network device may support multiple views, such as one for general command execution and another for configuration of the device. Commands issued in the execution mode may show device statistics, for example, and configuration commands issued in the configuration view will change a state of the device. The commands so learnt are sorted in the order of each view, like execution view or configuration view etc. Each view can potentially have a child view or sub view for that view.

2.2 Command Validation System

FIG. 6A is an example of a command validation system. User input in the form of one or more command line interface (CLI) commands 602 is coupled to a network management system (NMS) 600 that can display information using an output device 612, such as a video display. In an alternative embodiment, NMS 600 provides output to another process, program or system.

NMS 600 comprises auto learning logic 604 coupled to a command knowledge base 606, which is also coupled to a syntax checking engine 608 and semantics validation engine 610. In various embodiments, auto learning logic 604 and semantics validation engine can deliver commands to a network device 614 or output device 612. In one embodiment, NMS 600 is not coupled to network device 614, and the functions described herein are performed without a connection to the network device. In this embodiment, a user can perform syntax checking and semantic checking of a configuration file that is prepared offline with assurance that the configuration file will work when it is later applied to the network device. Moreover, this embodiment enables a user to prepare a configuration for a device when the device is unavailable or in a different location. In various embodiments, network device 614 comprises an element of infrastructure for a packet-switched network, such as a router, switch, etc.

Auto learning logic 604 receives CLI commands 602 and detects whether device 614 accepts and processes the commands or rejects the commands. Auto learning logic 604 may interpret output provided by the device to determine whether a particular command contains one or more syntax errors or semantic errors. Based on feedback from the device, auto learning logic 604 builds or supplements command knowledge base 606. Auto learning logic 604 can interpret the device knowledge bases of different type of devices and can produce a common command knowledge base that represents the commands that are common to all the devices. Further, the devices represented in the common command knowledge base may have common commands but have different versions of operating system software.

The command knowledge base 606 may comprise a database or a set of structured documents that encapsulate command syntax and semantics. In one embodiment, command knowledge base 606 is configured with one or more structured electronic documents that are supplemented by auto learning logic 604 as users issue commands.

Command knowledge base 606 is coupled to syntax checking engine 608 and semantics validation engine 610. Syntax checking engine 608 is responsible for receiving one or more CLI commands 602 and determining whether the commands contain syntax errors. Syntax checking engine 608 is coupled to output device 612 and can provide error messages to the output device. Syntax checking engine 608 also is coupled to provide output to the semantics validation engine 610, which is responsible for checking semantic meaning of commands 602 after the commands pass syntax checking. Semantics validation engine 610 can provide output, such as error messages, to output device 612. Semantics validation engine 610 also can provide commands that pass semantic validation to device 614.

2.3 Validating Syntax and Semantics of Device Commands

The multiple command views supported in network devices also may represent different execution contexts. When a device executes a command, the device switches context to a new command view. The new view typically contains different commands than the commands present in the previous or the parent view. The new view may also contain the same commands, but with different parameters. The commands of any particular view generally are used either for eliciting information from the device, or for changing the configuration of the device.

In general, any type of command has an associated syntactic structure. The syntactic structure of a command can be inferred by receiving a response message resulting from executing the command on the device.

The structure of any command can be visualized as a logical tree. A typical command has the form "Keyword parameter1 value1 parameter2 value2". After the command keyword, a command may include zero or more options. Issuing such a command may require zero or more options or input. When the command completes, the command either exits normally, either showing output or performing the requested configuration.

If the command is not valid in any mode, then the command either simply exits or gives an error message. The devices generally are not provided with functions to indicate whether a particular command is correct until the user presses the enter key or otherwise submits the command. However, in that approach, by the time the user learns that the syntax typed is wrong, a mistake has been made, and the user has to type the entire command again.

According to one embodiment, command syntax knowledge is acquired by the NMS, and helps the user, while the user is typing a command, to determine whether the command has valid syntax. According to an embodiment, a syntax and semantic validation engine interprets configuration command keystrokes at runtime and alerts the user when syntax or semantics of a command are wrong. In one embodiment, an alert comprises changing the color of the typed letters into red at the point at which incorrect syntax is used. If the command is correct, then the command is shown in blue color.

FIG. 6B is an example of a command validation process. At step 620, the process receives one or more CLI commands. At step 622, a syntax check is performed on the received commands. The syntax check of step 622 may proceed by applying rules represented in the knowledge base, as shown at step 625. At step 624, a test is performed to determine whether the syntax check identified an error. If so, then the error is identified using the output device, at step 626. Identifying a syntax error may include highlighting command text representing an error in a contrasting color, using reverse video, or any other suitable characteristics.

If no syntax error is found, then in step 628 semantic validation is performed. At step 630, a test is performed to determine whether semantic validation produced one or more errors. If so, then in step 632 the semantic error is identified. If no error is found, then in step 634 the commands are output to the network device.

Figure 2:
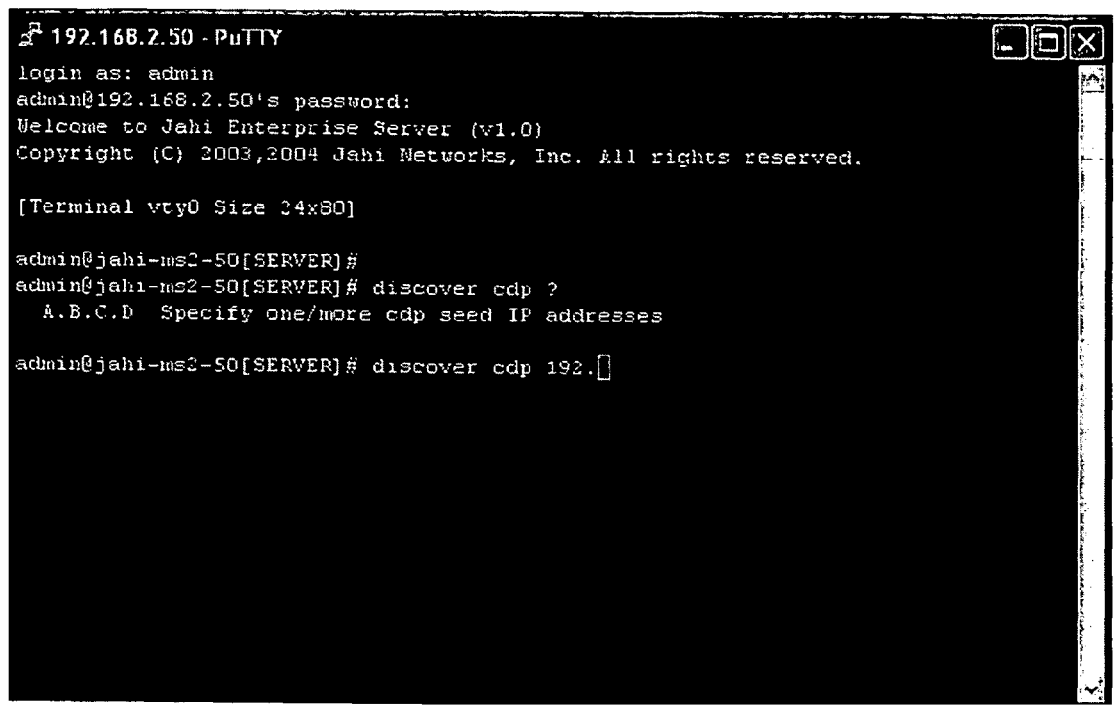
FIG. 2 is an example of syntax validation output for a command that is valid but incomplete.
Figure 3:
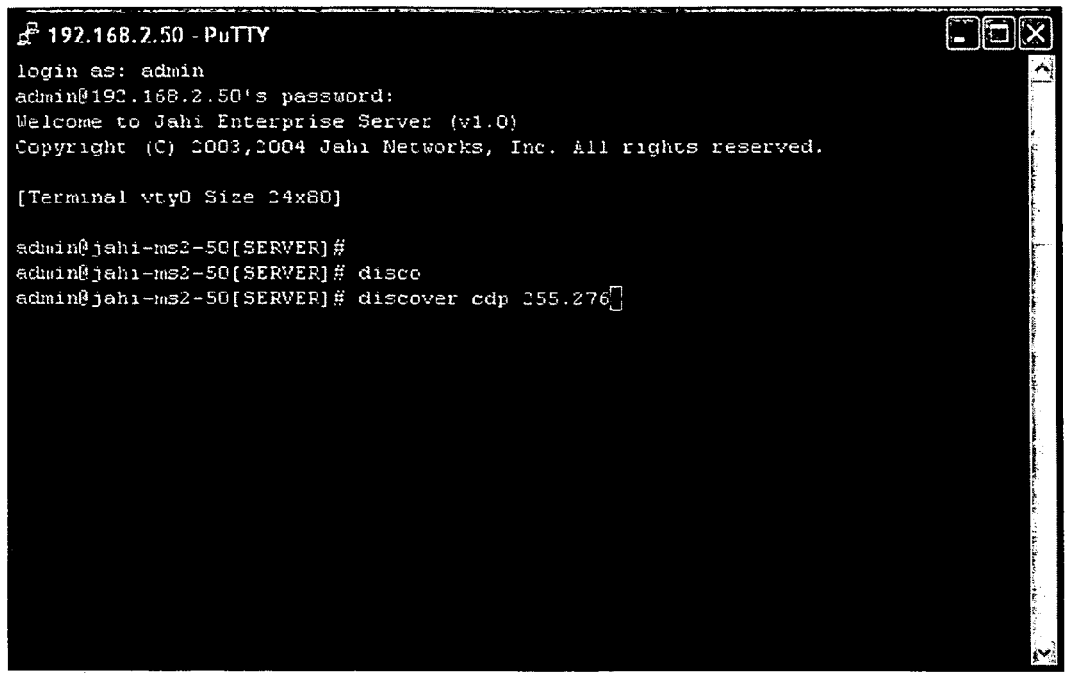
FIG. 3 is an example of command semantic validation output for a command with an invalid parameter.

FIG. 2 is an example of a command view showing a syntax validation output for a command that is valid but incomplete; FIG. 3 is an example of a command view showing a command semantic validation output for a command with an invalid parameter;

As a first example, referring now to FIG. 2, a user has typed the command "discover cdp?". However, such a command has incorrect syntax, because according to a command syntax knowledge base for the current device, the keyword "discover" and parameter "cdp" must be followed by a valid network address parameter. Therefore, in an embodiment, the NMS displays the parameter "cdp" in a contrasting color, such as red, to indicate a syntax error at that part of the command. Further, the NMS may display a corrective message, such as "A.B.C.D Specify one or more cdp seed IP addresses," as shown in FIG. 2. Thus, FIG. 2 provides an example of syntax validation output where the command entered is valid but incomplete. It is meant to give a continuous visual feedback to the user during command input. The title of the diagram needs to be changed.

FIG. 3 shows an example of semantic validation output where the command parameter entered is invalid. Semantic validation involves verifying the meaning of command terms as opposed to their form, presence or absence. For example, in the example of FIG. 3, a user has entered the command "discover cdp" followed by an erroneous network address starting with "255.276." The semantics of this entry are erroneous for two reasons. First, a valid IP address has four parts, e.g., "192.68.0.1". Second, each part of a valid IP address must range from 0 to 255; thus, a value of "276" is out of range. In an embodiment, based on the user's entry of "discover cdp," the NMS determines that an IP address is expected as a parameter next in the command. Further, the NMS determines that the IP address must have a four-part form with each part in the range of 0 to 255. Therefore, when the value "276" is detected, the NMS displays the partial entry "255.276" in a contrasting color, such as red.

Figure 5:
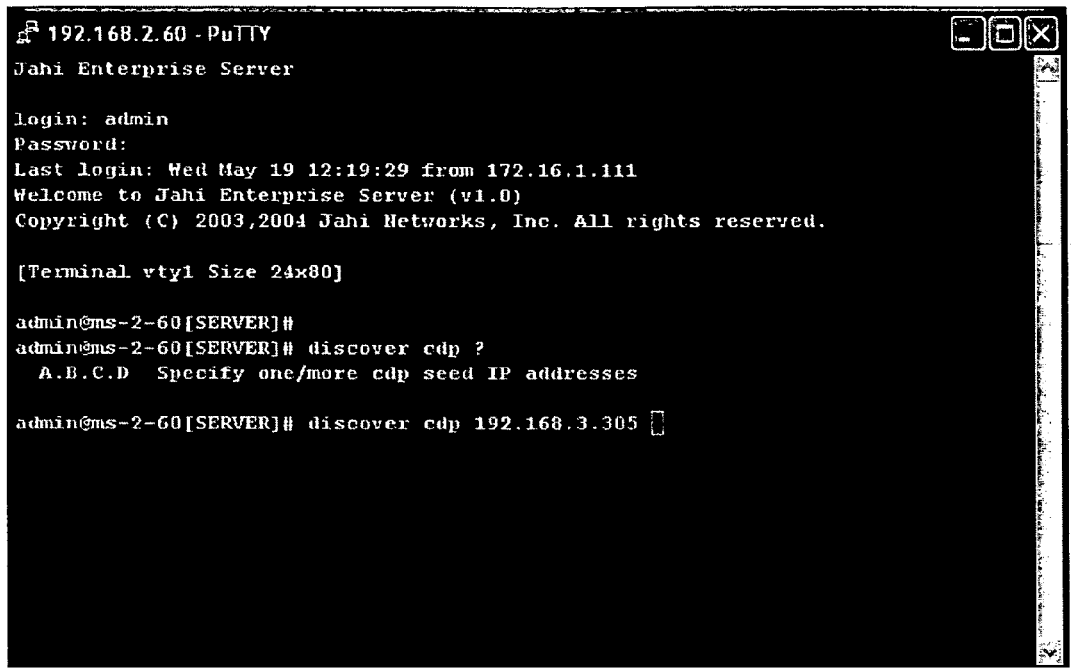
FIG. 5 is an example of command semantics verification.

FIG. 5 is a screen display diagram showing another example of command semantics validation, according to an embodiment. When a command is typed at the CLI (Command Line Interface), a syntax checker first verifies the correctness of the command syntax. For example, after a keyword such as "discover cdp" the command for logical completion requires an IP address parameter. If a user provides input such as "192.168.3.305," which includes one value "305" that is invalid because it is greater than 255, then a semantic validation engine warns the user that though the syntax is right the semantics are not correct. In one embodiment, the IP address is displayed in a contrasting color.

In one embodiment, command syntax and semantics are validated based on a knowledge base that is generated during an automatic command learning process for a device. In one embodiment, the knowledge base may comprise one or more Extensible Markup Language (XML) documents. FIG. 4 is an example showing an XML-based command knowledge base reflecting syntax and semantics for a set of test commands.

3.0 Implementation Mechanisms—Hardware Overview

Figure 7:
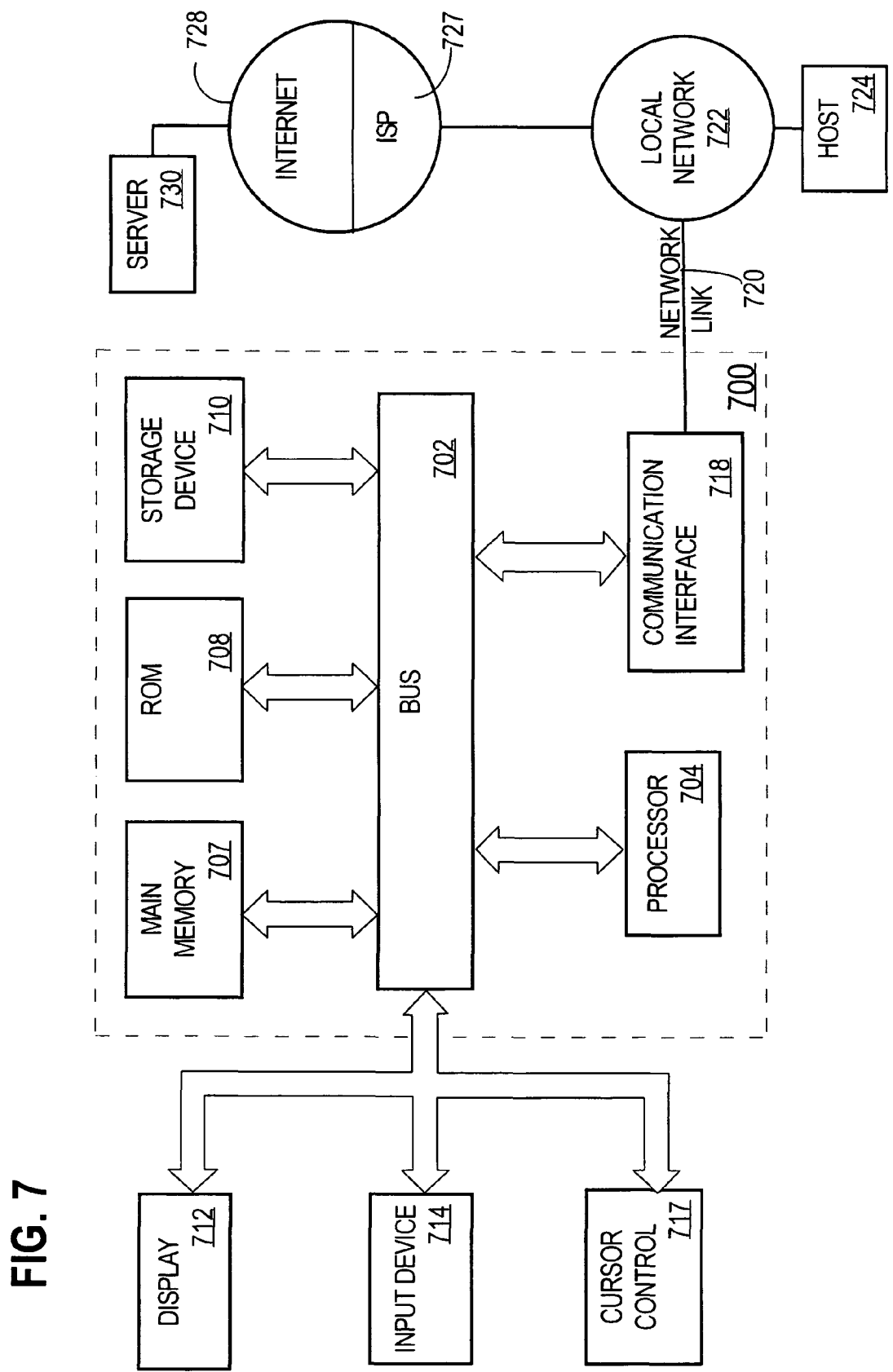
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for configuration syntax and semantic validation. According to one embodiment of the invention, configuration syntax and semantic validation is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for configuration syntax and semantic validation as described herein.

The received code may be executed by processor 704 as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising machine-implemented steps of:
receiving user input on a command line interface, the user input representing an incomplete portion of a command line interface (CLI) command for execution on a network device;
displaying the user input on the command line interface as the user input is being received on the command line interface;
interpreting the incomplete portion of the CLI command, as the user input is being received, to identify one or more syntax errors or semantic errors in the incomplete portion of the CLI command;
wherein interpreting the incomplete portion of the CLI command comprises validating the user input against a stored knowledge base of command syntax and semantics and determining whether one or more parameters, that follow a command keyword in the user input, are valid parameters for the command keyword;
in response to identifying the one or more syntax errors or semantic errors in the incomplete portion of the CLI command, generating and displaying a modified display, on the command line interface, that identifies the one or more syntax errors or semantic errors as the user input is being received on the command line interface.

2. A method as recited in claim 1, wherein the user input is validated against the stored knowledge base of command syntax and semantics with a currently displayed command view.

3. A method as recited in claim 1, wherein the modified display identifies the one or more syntax errors or semantic errors by displaying the user input in a first color and displaying the one or more syntax errors or semantic errors in a second color.

4. A method as recited in claim 1, wherein the interpreting is performed without connecting to the network device.

5. A method as recited in claim 1, wherein the interpreting includes validating the user input against the stored knowledge base of command syntax and semantics associated with a type of device that includes the network device and with a currently displayed command view, wherein the device knowledge bases of different type of devices are interpreted to produce a common command knowledge base that comprises one or more commands that are common to all the devices.

6. A method as recited in claim 5, wherein the devices with one or more commands in common have different versions of operating system software.

7. A method as recited in claim 1, further comprising concurrently receiving the user input at auto learning logic, wherein the auto learning logic interprets the user input and forms the stored knowledge base of command syntax and semantics associated with a type of device that includes the network device and with a currently displayed command view.

8. A method as recited in claim 1, wherein interpreting includes determining a currently displayed command view applicable to the incomplete portion of the CLI command and interpreting the incomplete portion of the CLI command based upon syntax and semantics in the knowledge base that are applicable to the currently displayed command view.

9. A computer-readable volatile or non-volatile medium carrying one or more sequences of instructions for performing syntax validation and semantic validation of commands for a network device, which instructions, when executed by one or more processors, cause the one or more processors to carry out the steps of:
receiving user input on a command line interface, the user input representing an incomplete portion of a command line interface (CLI) command for execution on a network device;
displaying the user input on the command line interface as the user input is being received on the command line interface;
interpreting the incomplete portion of the CLI command, as the user input is being received, to identify one or more syntax errors or semantic errors in the incomplete portion of the CLI command;
wherein interpreting the incomplete portion of the CLI command comprises validating the user input against a stored knowledge base of command syntax and semantics and determining whether one or more parameters, that follow a command keyword in the user input, are valid parameters for the command keyword;
in response to identifying the one or more syntax errors or semantic errors in the incomplete portion of the CLI command, generating and displaying a modified display, on the command line interface, that identifies the one or more syntax errors or semantic errors as the user input is being received on the command line interface.

10. A computer-readable volatile or non-volatile medium as recited in claim 9, wherein the user input is validated against the stored knowledge base of command syntax and semantics with a currently displayed command view.

11. A computer-readable volatile or non-volatile medium as recited in claim 9, wherein the modified display identifies the one or more syntax errors or semantic errors by displaying the user input in a first color and displaying the one or more syntax errors or semantic errors in a second color.

12. A computer-readable volatile or non-volatile medium as recited in claim 9, wherein the interpreting is performed without connecting to the network device.

13. A computer-readable volatile or non-volatile medium as recited in claim 9, wherein the interpreting includes validating the user input against the stored knowledge base of command syntax and semantics associated with a type of device that includes the network device and with a currently displayed command view, wherein the device knowledge bases of different type of devices are interpreted to produce a common command knowledge base that comprises one or more commands that are common to all the devices.

14. A computer-readable volatile or non-volatile medium as recited in claim 13, wherein the devices with one or more commands in common have different versions of operating system software.

15. A computer-readable volatile or non-volatile medium as recited in claim 9, further comprising concurrently receiving the user input at auto learning logic, wherein the auto learning logic interprets the user input and forms the stored knowledge base of command syntax and semantics associated with a type of device that includes the network device and with a currently displayed command view.

16. A computer-readable volatile or non-volatile medium as recited in claim 9, wherein interpreting includes determining a currently displayed command view applicable to the incomplete portion of the CLI command and interpreting the incomplete portion of the CLI command based upon syntax and semantics in the knowledge base that are applicable to the currently displayed command view.

17. An apparatus for performing syntax validation and semantic validation of commands for a network device, comprising:
one or more processors;
means for receiving user input on a command line interface, the user input representing an incomplete portion of a command line interface (CLI) command for execution on a network device;

means for displaying the user input on the command line interface as the user input is being received on the command line interface;

means for interpreting the incomplete portion of the CLI command, as the user input is being received, to identify one or more syntax errors or semantic errors in the incomplete portion of the CLI command;

wherein interpreting the incomplete portion of the CLI command comprises validating the user input against a stored knowledge base of command syntax and semantics and determining whether one or more parameters, that follow a command keyword in the user input, are valid parameters for the command keyword;

means for generating and displaying a modified display on the command line interface that identifies one or more syntax errors or semantic errors as the user input is being received and in response to identifying the one or more syntax errors or semantic errors.

18. An apparatus as recited in claim 17, wherein the user input is validated against the stored knowledge base of command syntax and semantics with a currently displayed command view.

19. An apparatus as recited in claim 17, wherein the modified display identifies the one or more syntax errors or semantic errors by displaying the user input in a first color and displaying the one or more syntax errors or semantic errors in a second color.

20. An apparatus as recited in claim 17, wherein the interpreting is performed without connecting to the network device.

21. An apparatus as recited in claim 17, wherein the interpreting includes validating the user input against the stored knowledge base of command syntax and semantics associated with a type of device that includes the network device and with a currently displayed command view, wherein the device knowledge bases of different type of devices are interpreted to produce a common command knowledge base that comprises one or more commands that are common to all the devices.

22. An apparatus as recited in claim 21, wherein the devices with one or more commands in common have different versions of operating system software.

23. An apparatus as recited in claim 17, further comprising concurrently receiving the user input at auto learning logic, wherein the auto learning logic interprets the user input and forms the stored knowledge base of command syntax and semantics associated with a type of device that includes the network device and with a currently displayed command view.

24. An apparatus as recited in claim 17, wherein interpreting includes determining a currently displayed command view applicable to the incomplete portion of the incomplete CLI command and interpreting the incomplete portion of the incomplete CLI command based upon syntax and semantics in the knowledge base that are applicable to the currently displayed command view.

25. An apparatus for performing syntax validation and semantic validation of commands for a network device, comprising:
one or more processors;
a command knowledge base;
one or more stored sequences of instructions organized as auto learning logic, a syntax checking engine, and a semantics validation engine, and which, when executed by the processor, cause the processor to carry out the steps of:

receiving user input on a command line interface, the user input representing an incomplete portion of a command line interface (CLI) command for execution on a network device;

displaying the user input on the command line interface as the user input is being received on the command line interface;

interpreting the incomplete portion of the CLI command, as the user input is being received, to identify one or more syntax errors or semantic errors in the incomplete portion of the CLI command;

wherein interpreting the incomplete portion of the CLI command comprises validating the user input against a stored knowledge base of command syntax and semantics and determining whether one or more parameters, that follow a command keyword in the user input, are valid parameters for the command keyword;

in response to identifying the one or more syntax errors or semantic errors in the incomplete portion of the CLI command, generating and displaying a modified display, on the command line interface, that identifies the one or more syntax errors or semantic errors as the user input is being received on the command line interface.

26. An apparatus as recited in claim 25, wherein the user input is validated with a currently displayed command view.

27. An apparatus as recited in claim 25, wherein the modified display identifies the one or more syntax errors or semantic errors by displaying the user input in a first color and displaying the one or more syntax errors or semantic errors in a second color.

28. An apparatus as recited in claim 25, wherein the interpreting is performed without connecting to the network device.

29. An apparatus as recited in claim 25, wherein the interpreting includes validating the user input against the stored knowledge base of command syntax and semantics associated with a type of device that includes the network device and with a currently displayed command view, wherein the device knowledge bases of different type of devices are interpreted to produce a common command knowledge base that comprises one or more commands that are common to all the devices.

30. An apparatus as recited in claim 29, wherein the devices with one or more commands in common have different versions of operating system software.

31. An apparatus as recited in claim 25, further comprising concurrently receiving the user input at auto learning logic, wherein the auto learning logic interprets the user input and forms the stored knowledge base of command syntax and semantics associated with a type of device that includes the network device and with a currently displayed command view.

32. An apparatus as recited in claim 25, wherein interpreting includes determining a currently displayed command view applicable to the incomplete portion of the CLI command and interpreting the incomplete portion of the CLI command based upon syntax and semantics in the knowledge base that are applicable to the current command-view.

* * * * *